P. L. CROWE & A. FRANKENHEIM.
SPEED REGULATOR FOR STOKERS.
APPLICATION FILED MAY 15, 1908.
1,003,036.
Patented Sept. 12, 1911.
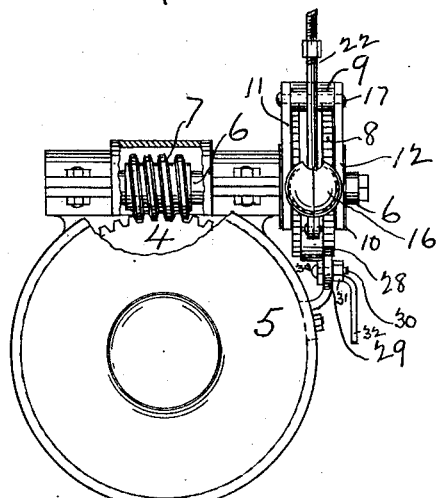
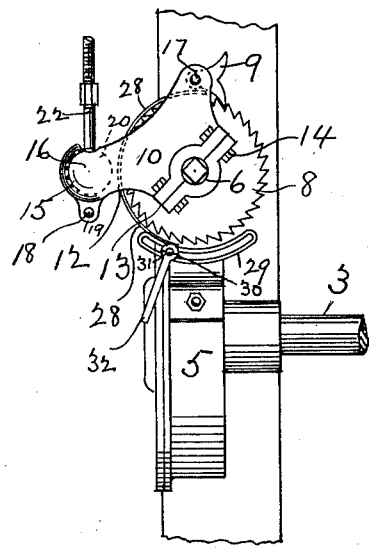
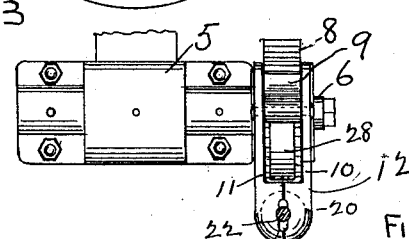
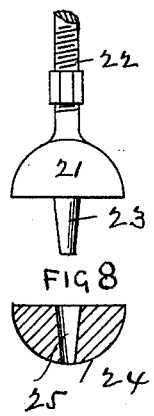
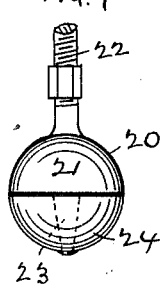
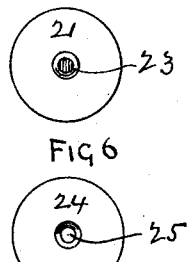
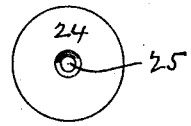
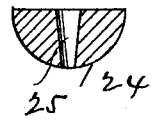
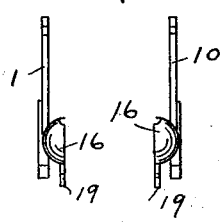
Witnesses:
Inventors

UNITED STATES PATENT OFFICE.

PAUL L. CROWE, OF JERSEY CITY, NEW JERSEY, AND AARON FRANKENHEIM, OF NEW YORK, N. Y.; SAID FRANKENHEIM ASSIGNOR TO SAID CROWE.

SPEED-REGULATOR FOR STOKERS.

1,003,036.      Specification of Letters Patent.      Patented Sept. 12, 1911.

Application filed May 15, 1908. Serial No. 433,099.

*To all whom it may concern:*

Be it known that we, PAUL L. CROWE, a resident of Jersey City, county of Hudson, and State of New Jersey, and AARON FRANKENHEIM, a resident of New York, county of New York, and State of New York, citizens of the United States, have invented certain new and useful Improvements in Speed-Regulators for Stokers, of which the following is a specification.

Our invention relates to speed regulators for stokers, and the object is to provide same with a simple device for effecting this result.

Referring to the drawings: Figure 1, is an end view of our improved speed regulating mechanism, the casing partly in section. Fig. 2, is a side view of the same. Fig. 3, is a plan view of the same. Fig. 4, is a detached elevation of the divided ball assembled, showing the stem connected thereto. Fig. 5, is a detached bottom view of the upper half of the divided ball. Fig. 6, is a detached top view of the lower half of the ball. Fig. 7, is a detached side view of the upper half of the ball showing the assembling pin. Fig. 8, is a detached sectional view of the lower half of the ball. Fig. 9, is a detached front view of the divided bracket, the two halves being separated, and showing the halves of the ball seat.

The shaft 3, which can belong to any machine, has keyed or mounted on its end, the worm-wheel 4, incased in the box 5, which supports the bearing of the worm-shaft 6. On this shaft 6, is mounted the worm 7, which meshes into the worm-wheel 4. (See Fig. 1.) The outer end of worm-shaft 6, has mounted on it the ratchet-wheel 8, acted upon by the double-edge pawl 9, pivoted on pin 17, between the two halves 10—11 of the actuating bracket 12 (see Fig. 2); which halves are placed on each side of the ratchet-wheel 8, over the worm-shaft 6, upon which they freely move up and down. The bracket halves 10—11, are held to the shaft 6, by the bearing caps 13, and secured thereto, by bolts 14. The lower ends 15, of the divided bracket are formed with a ball-bearing seat 16, half of the seat on one half of the bracket and the other half of the seat on the other half of the bracket. The two bracket halves are securely held together by the pawl pin 17, and bolt 18, passing through the lugs 19. Into the ball-seat of the divided bracket is placed the divided ball 20, the upper half 21, having an upwardly extending stem 22, integral therewith and a downwardly-extending conical assembling pin 23. The lower half, 24, of the ball, has a conical hole 25, into which the pin 23, enters to assemble them and to hold the halves together. The pin 23, is then riveted over at the end, (see Fig. 4).

The object of forming the ball in halves is to lessen the expense of replacing an entire ball when worn. In this case when one half is worn, it can be replaced by a new one, which is easily done by unriveting the pin 23 and removing the worn half. The upper stem 22, of ball is threaded and connected by a coupling to an eccentric rod.

To regulate the speed of the ratchet wheel, we employ the metallic strip 28, which is connected to the slotted bracket 29 by pin 30, having its bearing in the bracket and also having an adjusting nut 31, with lever arm 32. The bracket 29, is supported on the gear box 5. The free end of the strip 28, passes up from the bracket and partly around the ratchet-wheel 8, to the pawl 9, and when said strip is adjusted on the slotted bracket by the lever nut it can be set to pass under the pawl 9, so as to cause same to rotate the ratchet-wheel 8, one, two, three or four teeth, as the case may require. By constructing the ball in halves we are enabled to cast the upper half of malleable iron so that the stem can easily be threaded and yet have sufficient metal to withstand the prolonged strain. The lower half having the work to perform is made of steel, to resist wear, and also to be removed when necessary.

The pawl is constructed with a double edge; 1st, to have an extra edge to use in case of necessity; 2nd, to add an additional weight to the extreme outer end of the pawl to insure of it dropping into position in a ratchet tooth without failure.

What we claim is:

A speed regulating device for stoker mechanism, comprising a divided bracket, a shaft upon which the said bracket is pivotally mounted means for holding said bracket halves together, said bracket having a bearing seat, an operating rod, a ball mounted on one end of said rod, and adapted to operate in the bearing seat of said bracket a double edge pawl pivotally mounted on said bracket, a ratchet wheel mounted on said bracket shaft, the point of said pawl engaging with the teeth of said ratchet as the bracket is actuated, and means for regulating the effective stroke of the pawl, comprising an adjustable band encircling part of the teeth of said ratchet, and means for adjusting said band consisting of a slotted bracket support, a set nut sliding in said bracket and to which is attached one end of said band, and means for supporting said slotted bracket support.

Signed at New York in the county of New York and State of New York this 12th day of May A. D. 1908.

PAUL L. CROWE.
AARON FRANKENHEIM.

Witnesses:
FRANK J. DUFFY,
PH. E. HARTH.

Copies of this patent may be obtained for five cents each, by addressing the "Commissioner of Patents, Washington, D. C."